(12) United States Patent
Kamikawa et al.

(10) Patent No.: US 7,766,554 B2
(45) Date of Patent: Aug. 3, 2010

(54) WHEEL ROLLING BEARING APPARATUS

(75) Inventors: Tsuyoshi Kamikawa, Nara (JP); Yoshishige Takeda, Osaka (JP); Naoto Araki, Yao (JP); Kazuhisa Kajihara, Yao (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 403 days.

(21) Appl. No.: 11/902,635

(22) Filed: Sep. 24, 2007

(65) Prior Publication Data

US 2008/0187264 A1   Aug. 7, 2008

(30) Foreign Application Priority Data

Sep. 25, 2006  (JP) ................ P2006-259686
Sep. 25, 2006  (JP) ................ P2006-259687

(51) Int. Cl.
  *F16C 13/00* (2006.01)
(52) U.S. Cl. .................. 384/544; 384/589
(58) Field of Classification Search .......... 384/544, 384/589, 537
See application file for complete search history.

(56) References Cited

U.S. PATENT DOCUMENTS

| | | | |
|---|---|---|---|
| 4,893,960 A | 1/1990 | Beier et al. | |
| 6,250,814 B1 | 6/2001 | Tajima et al. | |
| 6,357,925 B2 | 3/2002 | Tajima et al. | |
| 6,926,448 B2 | 8/2005 | Ouchi | |
| 7,118,182 B2 | 10/2006 | Kayama et al. | |
| 7,125,171 B2 | 10/2006 | Ouchi | |
| 2004/0120622 A1* | 6/2004 | Tajima et al. | 384/544 |
| 2006/0023984 A1* | 2/2006 | Terada et al. | 384/544 |
| 2006/0165332 A1 | 7/2006 | Terada et al. | |

FOREIGN PATENT DOCUMENTS

| | | |
|---|---|---|
| JP | 2532672 | 1/1997 |
| JP | 2000-110840 | 4/2000 |
| JP | 2000-158905 | 6/2000 |
| JP | 2000-161368 | 6/2000 |
| JP | 2002-87010 | 3/2002 |
| JP | 2002-106557 | 4/2002 |
| JP | 2003-97588 | 4/2003 |
| JP | 2003-136908 | 5/2003 |
| JP | 2005-24020 | 1/2005 |
| JP | 2005-75067 | 3/2005 |
| JP | 2005-75229 | 3/2005 |
| JP | 2006-103558 | 4/2006 |
| JP | 2006-188188 | 7/2006 |
| JP | 2006-189138 | 7/2006 |

* cited by examiner

*Primary Examiner*—Thomas R Hannon
(74) *Attorney, Agent, or Firm*—McGinn IP Law Group, PLLC

(57) ABSTRACT

Crowning is applied to a side surface of an inner ring which abuts against a side surface of a drive shaft in a radial direction. With this construction, when the two side surfaces abut against each other by a pressing operation of a threadedly-engaged nut at the time of connecting the drive shaft and an inner shaft, a contact pressure distribution of abutting surfaces is made generally uniform, thereby suppressing the occurrence of an edge load. By thus preventing a contact pressure from increasing at part of the abutting surfaces, energy released by a stick-slip phenomenon is reduced, and a sound pressure level of an abnormal sound generated at this time is reduced.

12 Claims, 8 Drawing Sheets

FIG. 2
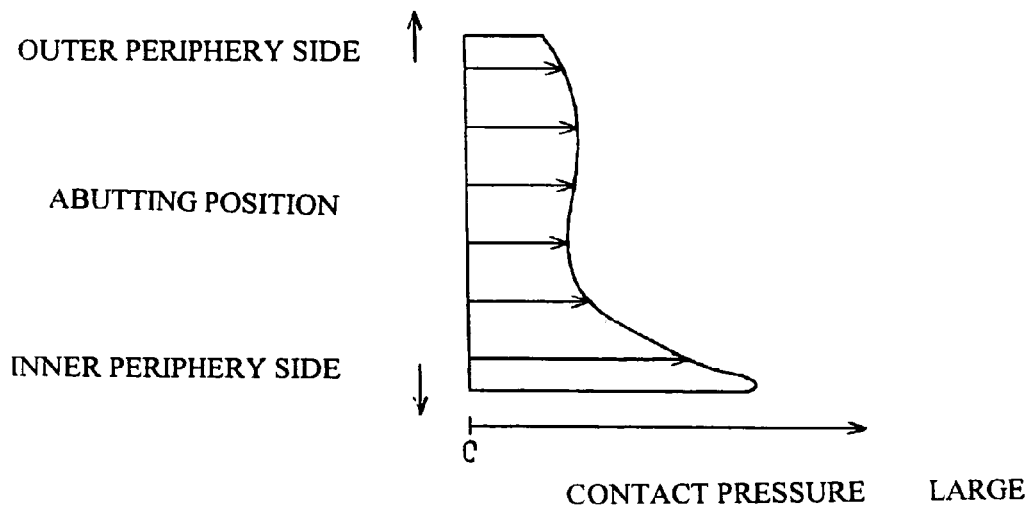
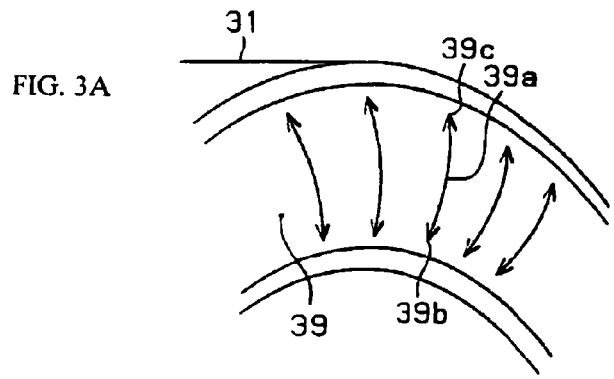
FIG. 3A
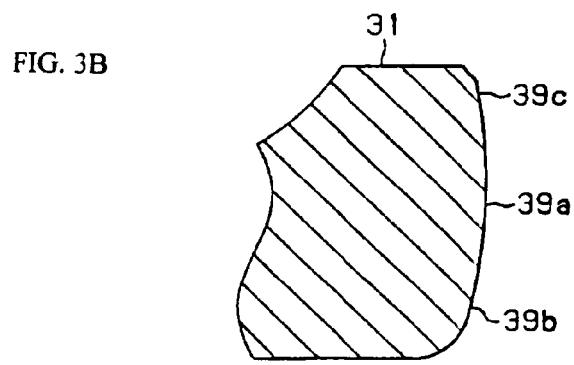
FIG. 3B

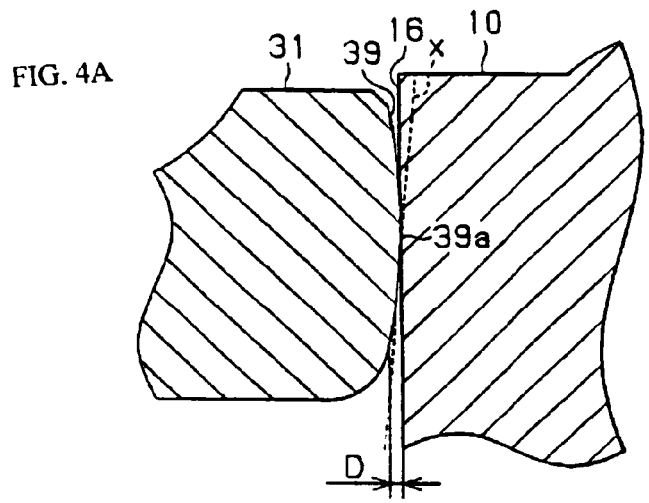
FIG. 4A
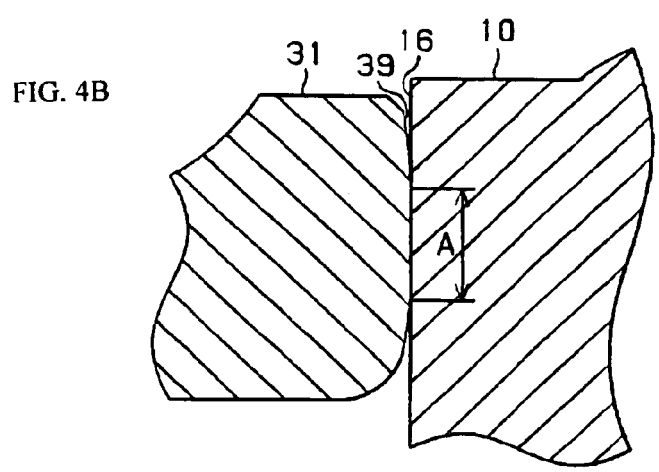
FIG. 4B
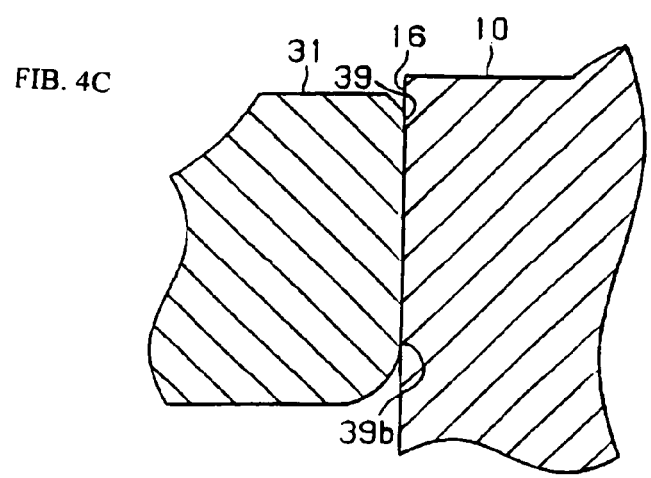
FIB. 4C

FIG. 7
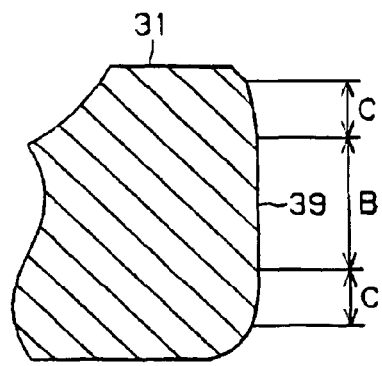
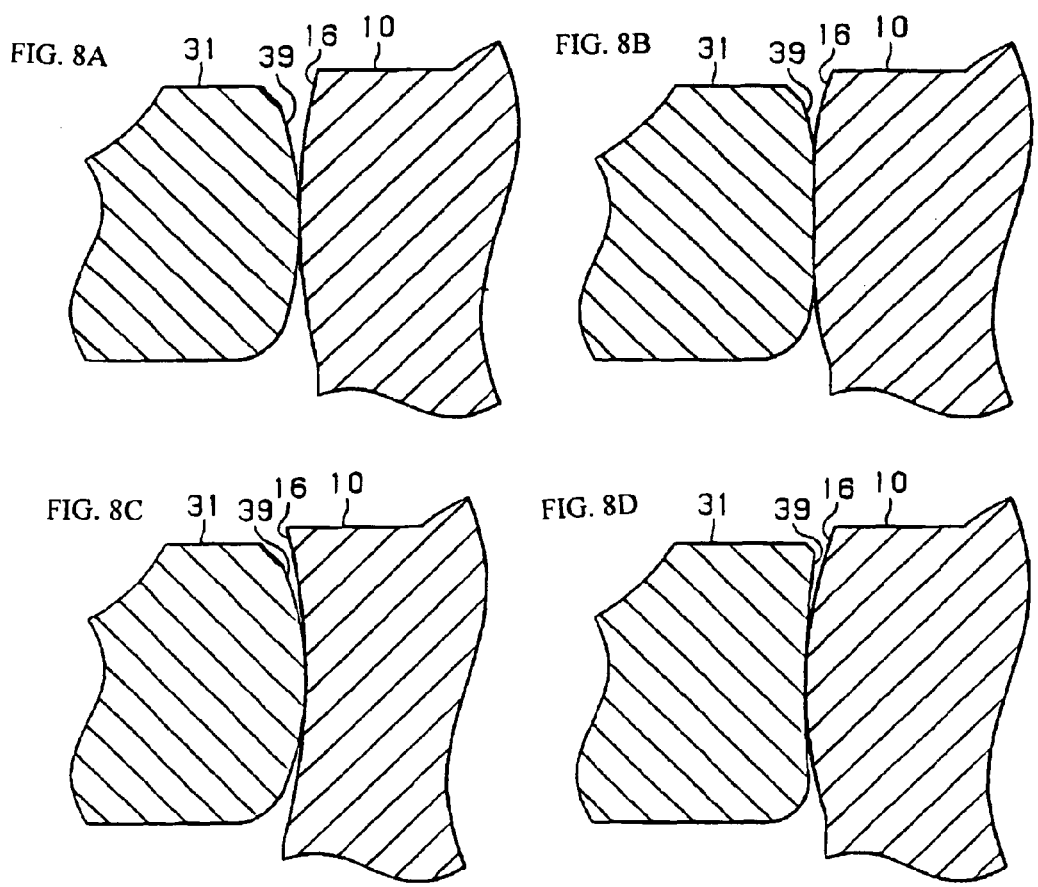

WHEEL ROLLING BEARING APPARATUS

BACKGROUND OF THE INVENTION

This invention relates to a rolling bearing apparatus for a wheel used mainly in an automobile.

There is known a conventional wheel rolling bearing apparatus, for supporting a driving wheel, in which a drive shaft connected to an engine is coupled to a central hole in an inner shaft for the mounting a wheel thereon so that the drive shaft and the inner shaft can rotate in unison. Such a wheel bearing apparatus is so constructed that an inner ring of a rolling bearing is mounted onto an outer periphery of the inner shaft from the inner side (that is, that side facing away from the wheel-mounting side) as described in Japanese Utility Model Registration No. 2,532,672. The drive shaft includes a larger-diameter portion formed at its inner side portion, and a smaller-diameter portion formed at its outer side portion (that is, at the wheel mounting-side), and this smaller-diameter portion is fitted in the center hole of the inner shaft. A spline formed on an inner peripheral surface of the center hole of the inner shaft are brought into spline engagement with a spline formed on an outer peripheral surface of the smaller-diameter portion of the drive shaft, so that the inner shaft and the drive shaft are assembled together in the rotating direction. Also, an inner side surface of the inner ring is caused to abut against an outer side surface of the larger-diameter portion, and a nut is threaded onto a screw portion formed on an outer end portion of the smaller-diameter portion of the drive shaft, and by doing so, the drive shaft is pressed toward the outer side relative to the inner shaft, thereby connecting the inner shaft and the drive shaft together in the axial direction. By thus connecting the drive shaft to the inner shaft, etc., a suitable preload is applied to the inner ring of the rolling bearing, and also the drive shaft, the inner shaft and the inner ring can be rotated in unison.

There is known another such wheel rolling bearing apparatus in which the above method of fixing the inner ring relative to the inner shaft is changed, and an inner ring is fixed to an inner shaft by caulking an inner-side shaft end of the inner shaft (This caulking will hereinafter be referred to as "shaft end caulking"). In this wheel rolling bearing apparatus, a suitable preload is applied to the inner ring of the rolling bearing by the shaft end caulking. Then, an inner side surface of the caulking portion is caused to abut against an outer side surface of a larger-diameter portion of a drive shaft, and the drive shaft and the inner shaft are connected together by the pressing effected by a nut so that the drive shaft, the inner shaft and the inner ring can be rotated in unison.

Incidentally, in a situation in which a vehicle is quickly started or is quickly turned, a large torsional torque often acts on the drive shaft of the above wheel rolling bearing apparatus. When a large torsional torque is applied to the drive shaft, a very small relative motion tends to develop in a circumferential direction at the abutting surfaces because of the difference in rigidity between the drive shaft and the inner shaft, etc., at a region between the spline and the abutting surfaces. At this time, a stick-slip phenomenon occurs in which the relative motion of the abutting surfaces will not occur until the torsional torque occurring at the abutting surfaces exceeds a frictional resistance due to a contact pressure produced by the pressing effected by the nut, and when the torsional torque exceeds the frictional resistance, the relative motion suddenly occurs, thereby releasing the energy. When such a stick-slip phenomenon occurs, an abnormal sound is generated by the suddenly-occurring relative motion of the abutting surfaces.

Therefore, there has been proposed a wheel rolling bearing apparatus as described in Japanese Utility Model Registration No. 2,532,672, in which a low frictional member is interposed between abutting surfaces. In this wheel rolling bearing apparatus, the low frictional member enables the abutting surfaces to easily slip so as to suppress the occurrence of a stick-slip phenomenon, thereby suppressing the generation of an abnormal sound.

However, the wheel rolling bearing apparatus as disclosed in Japanese Utility Model Registration No. 2,532,672 is so constructed that the abutting surfaces can easily slip, and therefore there are fears that the rigidity in a connected condition of a drive shaft and an inner shaft, etc., may be lowered and that a fatigue strength of the drive shaft, etc., may be lowered. And besides, when wear of the drive shaft, etc., due to slip of the abutting surfaces progresses, there are fears that the strength of connection between the drive shaft and the inner shaft, etc., and a preload applied to the inner ring may be lowered.

Furthermore, with respect to an abnormal sound due to the above stick-sip phenomenon, the higher the contact pressure produced by the pressing by the nut becomes, the larger the energy released by the relative motion becomes, so that the sound pressure level increases. Therefore, in the case where attention is directed only to the coefficient of friction without considering the magnitude of the contact pressure as described in Japanese Utility Model Registration No. 2,532, 672, the sound pressure level of the abnormal sound can not always be effectively reduced.

SUMMARY OF THE INVENTION

This invention has been made in view of the above circumstances, and an object of the invention is to provide a wheel rolling bearing apparatus in which a sound pressure level of an abnormal sound generated by a stick-slip phenomenon of abutting surfaces can be suitably reduced.

The above object has been achieved by a wheel rolling bearing apparatus of the invention comprising a drive shaft including a larger-diameter portion formed at its inner side portion and a smaller-diameter portion formed at its outer side portion; an inner shaft mounted on an outer periphery of the smaller-diameter portion through a spline; and an inner ring of a rolling bearing mounted on an outer periphery of the inner shaft from the inner side; wherein an inner side surface of the inner ring is caused to abut against an outer side surface of the larger-diameter portion, and the drive shaft is pressed toward the outer side relative to the inner shaft, thereby assembling the drive shaft, the inner shaft and the inner ring together; characterized in that abutting surfaces of the side surfaces abutting against each other are formed respectively into such shapes that a pressure contact distribution obtained at the abutting surfaces by the pressing of the drive shaft is made generally uniform.

When the inner side surface of the inner ring is caused to abut against the outer side surface of the larger-diameter portion of the drive shaft, and the drive shaft is pressed toward the outer side relative to the inner shaft so as to connect the drive shaft to the inner shaft, generally, a contact pressure applied to the abutting surface of each of the side surfaces is not uniform, and a contact pressure distribution is such that a maximum value is given at an end of the abutting surface, that is to say, a so-called edge load is liable to occur. When the drive shaft is pressed toward the outer side relative to the inner shaft, for example, by threading a nut on a screw portion formed at an outer (distal) end portion of the smaller-diameter portion of the drive shaft, the smaller-diameter portion of the drive shaft is pulled toward the outer side, and therefore the contact pressure relatively increases at the inner periphery-side of the abutting surfaces, so that an edge load is liable to occur. When the edge load occurs, there exists a region where the contact pressure is large, and a frictional resistance at this region increases, so that the frictional resistance of the abutting surfaces increases as a whole. Therefore, energy stored at the abutting surfaces increases, and an abnormal sound generated upon release of this energy becomes large.

In the above construction of the invention, however, the abutting surface of the inner side surface of the inner ring and the abutting surface of the outer side surface of the larger-diameter portion of the drive shaft are formed respectively into such shapes that the pressure contact distribution obtained by the pressing of the drive shaft is made generally uniform, and therefore the occurrence of such an edge load can be suppressed. Therefore, a large abnormal sound generated by a stick-slip phenomenon due to the increase of the contact pressure at part of the abutting surfaces can be suppressed. Therefore, the sound pressure level of an abnormal sound, generated in a situation in which a vehicle is quickly started or is quickly turned, can be reduced.

With this construction, the contact pressure distribution of the abutting surfaces is made generally uniform, and therefore the force for pressing the drive shaft toward the outer side relative to the inner shaft can be increased while reducing the sound pressure level of an abnormal sound. Therefore, the strength of connection between the drive shaft and the inner shaft, as well as a preload applied to the inner ring, can be sufficiently secured.

Further, a wheel rolling bearing apparatus according to the invention comprises a drive shaft including a larger-diameter portion formed at its inner side portion and a smaller-diameter portion formed at its outer side portion; an inner shaft mounted on an outer periphery of the smaller-diameter portion through a spline; and an inner ring of a rolling bearing fixed to the inner shaft by caulking an inner-side shaft end of the inner shaft; wherein an inner side surface of a caulking portion formed by the caulked shaft end is caused to abut against an outer side surface of the larger-diameter portion, and the drive shaft is pressed toward the outer side relative to the inner shaft, thereby connecting the drive shaft and the inner shaft together; the bearing apparatus being characterized in that abutting surfaces of the side surfaces abutting against each other are formed respectively into such shapes that a pressure contact distribution obtained at the abutting surfaces by the pressing of the drive shaft is made generally uniform.

Also, when the side surface of the caulking portion formed by the caulked shaft end is caused to abut against the side surface of the larger-diameter portion of the drive shaft, and the drive shaft is pressed toward the outer side relative to the inner shaft so as to connect the drive shaft to the inner shaft, an edge load is liable to occur at the abutting surfaces as described above. In this construction of the invention, however, the abutting surfaces of the side surfaces of the caulking portion and the drive shaft are formed respectively into such shapes that the pressure contact distribution obtained by the pressing of the drive shaft is made generally uniform. Therefore, the occurrence of an edge load is suppressed, and the sound pressure level of an abnormal sound generated by a stick-slip phenomenon of the abutting surfaces can be reduced. By thus making the contact pressure distribution of the abutting surfaces generally uniform, the force for pressing the drive shaft toward the outer side relative to the inner shaft can be increased, and therefore the strength of connection between the drive shaft and the inner shaft, etc., can be sufficiently secured.

According to the wheel rolling bearing apparatus of the invention, crowning is applied to at least one of the abutting surfaces in a radial direction.

In this construction, crowning is applied to one of the abutting surfaces in the radial direction, and therefore the occurrence of an edge load at radial end portions of the abutting surface can be suitably suppressed. Therefore, the sound pressure level of an abnormal sound generated by a stick-slip phenomenon of the abutting surfaces can be reduced. And besides, when the crowning is thus applied to the abutting surface, a high contact pressure occurring due to a very small inclination of the abutting surfaces relative to each other can be reduced. The crowning applied to the abutting surface only need to be finished into such a shape that a radially-central portion is higher than an inner periphery-side end portion and an outer periphery-side end portion, and any suitable crowning such as arc-shaped crowning, oval crowning, trapezoidal crowning, etc., may be used.

According to the wheel rolling bearing apparatus of the invention, an end relief is applied to at least one of the abutting surfaces in a radial direction.

Here, the term "end relief" means such a shape that a height of a surface is gradually decreasing at predetermined areas (of a predetermined width) of opposite end portions of the surface.

In this construction, the end relief is applied to at least one of the abutting surfaces, and therefore the occurrence of an edge load at the radial end portions of the abutting surfaces can be suitably suppressed. Therefore, the sound pressure level of an abnormal sound generated by a stick-slip phenomenon of the abutting surfaces can be reduced. And besides, when the end relief is thus applied to the abutting surface, a high contact pressure occurring due to a very small inclination of the abutting surfaces relative to each other can be reduced as much as possible.

According to the wheel rolling bearing apparatus of the invention, the abutting surfaces are formed such that the axial distance between the abutting surfaces at the radial end portions thereof is 10 to 500 µm in a condition in which the abutting surfaces are disposed in contact with each other without effecting the pressing.

In this construction, the abutting surfaces are formed such that the axial distance between the abutting surfaces at the radial end portions thereof is 10 to 500 µm in the condition in which the abutting surfaces are disposed in contact with each other without effecting the pressing, and therefore when the pressing is effected, the contact pressure distribution of the abutting surfaces can be made generally uniform while suppressing the occurrence of an edge load at the radial end portions.

In the present invention, the abutting surfaces of the drive shaft and the inner shaft or the like are formed into such shapes that the contact pressure distribution at the abutting surfaces is made generally uniform when the drive shaft is connected to the inner shaft, etc. Therefore, the occurrence of an edge load is suppressed, and a large abnormal sound generated due to the increase of the contact pressure at part of the abutting surfaces can be suppressed. Therefore, the sound pressure level of an abnormal sound generated by a stick-slip phenomenon can be reduced.

The above object has been achieved also by a wheel rolling bearing apparatus of the invention of claim 6 comprising a drive shaft including a larger-diameter portion formed at its inner side portion and a smaller-diameter portion formed at its outer side portion; an inner shaft mounted on an outer periphery of the smaller-diameter portion through a spline; and an inner ring of a rolling bearing mounted on an outer periphery of the inner shaft from the inner side; wherein an inner side surface of the inner ring is caused to abut against an outer side surface of the larger-diameter portion, and the drive shaft is pressed toward the outer side relative to the inner shaft, thereby connecting the drive shaft, the inner shaft and the inner ring together; the bearing apparatus being characterized in that the inner ring has a curved surface portion formed at a corner portion defined by the inner side surface and an inner wall surface formed at an inner peripheral edge of the inner side surface, and the curved surface portion is connected with the inner side surface in tangential relation thereto.

In this construction, the inner ring has the curved surface portion formed at the corner portion defined by its inner side surface (abutting against the outer side surface of the larger-diameter portion of the drive shaft) and the inner wall surface formed at the inner peripheral edge of the inner side surface, and the curved surface portion is connected with the inner side surface in tangential relation thereto. Therefore, the inner peripheral end of the side surface of the inner ring is prevented from being formed into an edge shape. Therefore, the occurrence of an edge load can be alleviated, and a large abnormal sound generated by a stick-slip phenomenon due to the increase of the contact pressure at part of the abutting surfaces can be suppressed. Therefore, the sound pressure level of an abnormal sound, generated in a situation in which a vehicle is quickly started or is quickly turned, can be reduced.

The wheel rolling bearing apparatus of the invention of claim 7, depending from claim 6, is characterized in that the curved surface portion is formed by applying radius chamfering to that portion of the inner ring disposed between the inner side surface and the inner wall surface.

In this construction, the curved surface portion formed at the corner portion of the inner ring is formed by applying radius chamfering to the portion of the inner ring disposed between the inner side surface and the inner wall surface. Therefore, the inner peripheral end of the side surface of the inner ring is prevented from being formed into an edge shape, and the occurrence of an edge load is alleviated, and the sound pressure level of an abnormal sound generated by a stick-slip phenomenon can be suitably reduced.

In the present invention, the inner ring has the curved surface portion formed at the corner portion defined by its inner side surface (abutting against the drive shaft) and the inner wall surface formed at the inner peripheral edge of the inner side surface, and the curved surface portion is connected with the inner side surface in tangential relation thereto. Therefore, the inner peripheral end of the side surface of the inner ring is prevented from being formed into an edge shape. Therefore, the occurrence of an edge load can be suppressed, and the sound pressure level of an abnormal sound generated by a stick-slip phenomenon of the abutting surfaces can be reduced.

BRIEF DESCRIPTION OF THE DRAWINGS

FIG. 2 is a graph showing a contact pressure distribution at abutting surfaces of a comparative example.

FIG. 3A is a perspective view of a portion of an inner ring, showing a shape of a side surface thereof, and FIG. 3B is a fragmentary cross-sectional view showing the side surface of the inner ring.

FIG. 4A is a cross-sectional view showing a condition in which abutting surfaces are disposed in contact with each other at the time of connecting a drive shaft and an inner shaft together, FIG. 4B is a cross-sectional view showing a condition in which a pressing force is applied to the abutting surfaces, and FIG. 4C is a cross-sectional view showing a condition in which the connection between the drive shaft and the inner shaft is completed.

FIG. 7 is a cross-sectional view showing a modified abutting surface of the invention.

FIGS. 8A to 8D are cross-sectional views showing modified abutting surfaces of the invention.

DETAILED DESCRIPTION OF PREFERRED EMBODIMENTS

First Embodiment

Figure 1:
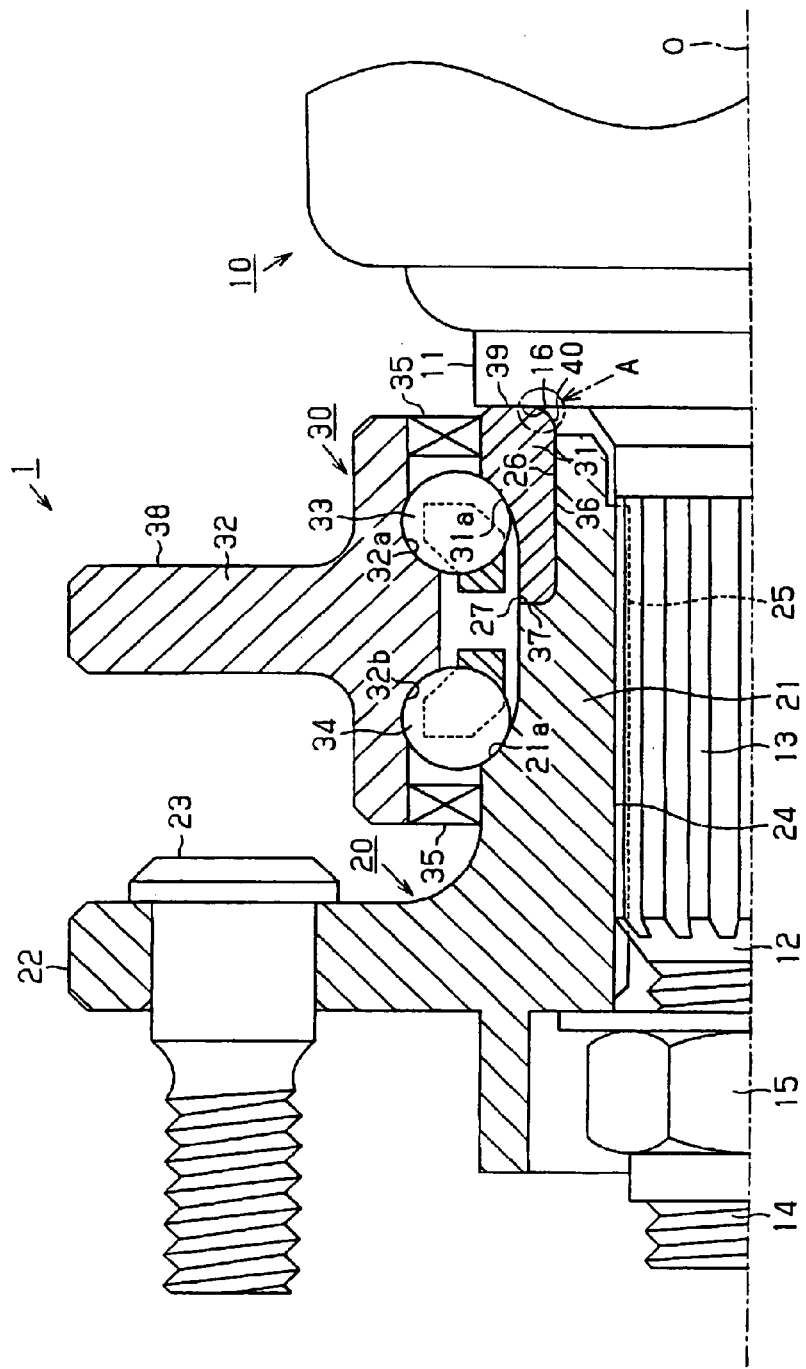
FIG. 1 is a longitudinal cross-sectional view of a wheel rolling bearing apparatus according to a first embodiment of the present invention.

A wheel rolling bearing apparatus according to a first embodiment of the present invention will now be described with reference to FIGS. 1 to 5. FIG. 1 is a longitudinal cross-sectional view of the wheel rolling bearing apparatus 1. The wheel rolling bearing apparatus 1 comprises a drive shaft 10, an inner shaft 20, and a rolling bearing 30.

The drive shaft 10 is connected to an engine via a constant velocity joint and a differential gear (both of which are not shown), and an output power (rotation) of the engine is transmitted to the drive shaft 10. The drive shaft 10 includes a larger-diameter portion 11 formed at its inner side portion for connection to the constant velocity joint, and a smaller-diameter portion 12 formed at its outer side portion for connection to an inner shaft. A spline portion 13 is formed on an axially-intermediate portion of an outer periphery of the smaller-diameter portion 12 of the drive shaft 10, and a screw portion 14 is formed at an outer (distal) end of the drive shaft 10.

The inner shaft 20 includes a shaft portion 21, and an annular flange portion 22 formed at an outer end portion of the shaft portion 21 and extending radially outwardly from this outer end portion. A wheel (not shown) is fastened to the flange portion 22 by bolts 23. A center hole 24 is formed axially through the shaft portion 21, and has its axis coinciding with the center (or the axis) of the shaft portion 21. A spline portion 25 is formed on that portion of an inner periphery of the center hole 24 opposed to the spline portion 13 of the drive shaft 10.

The rolling bearing 30 is a double row angular contact bearing, and is mounted on an axially-central portion of an outer peripheral surface of the shaft portion 21. The rolling bearing 30 comprises an inner ring 31, an outer ring 32, two rows of rolling elements, that is, a first (inner) row of balls 33 and a second (outer) row of balls 34, and seal members 35 disposed respectively at inner and outer side portions of the bearing 30. The inner ring 31 is mounted onto the outer periphery of the shaft portion 21 of the inner shaft 20 from the inner side, and an inner peripheral surface 36 of the inner ring 31 is fitted on an outer peripheral surface 26 of the shaft portion 21, and an outer side surface 37 of the inner ring 31 abuts against a step portion side surface 27 of the shaft portion 21. A first raceway 31a serving as a raceway surface for the inner balls 33 is formed on the outer periphery of the inner ring 31. A second raceway 21a serving as a raceway surface for the outer balls 34 is formed on that portion of the outer periphery of the shaft portion 21 close to the flange portion 22.

On the other hand, the outer ring 32 includes a first outer ring raceway 32a opposed to the first raceway 31a, and a second outer ring raceway 32b opposed to the second raceway 21a. A radially outwardly-extending flange portion 38 is formed on the outer periphery of the outer ring 32. This flange portion 38 is mounted on a suspension apparatus of a vehicle body (not shown). The inner balls 33 are disposed between the first raceway 31a and the first outer ring raceway 32a, and the outer balls 34 are disposed between the second raceway 21a and the second outer ring raceway 32b. The inner seal member 35 is disposed between an inner end portion of the outer ring 32 and the inner ring 31, while the outer seal member 35 is disposed between an outer end portion of the outer ring 32 and the shaft portion 21. These seal members 35 prevent foreign matters (such as muddy water, gravel and small stones) from intruding into the interior of the rolling bearing 30 through a clearance between the outer ring 32 and the inner ring 31 and a clearance between the outer ring 32 and the shaft portion 21 during the travel of the vehicle.

In the wheel rolling bearing apparatus 1 of the above construction, the drive shaft 10 and the inner shaft 20 are connected together in the following manner. The smaller-diameter portion 12 of the drive shaft 10 is inserted into the center hole 24 of the inner shaft 20, thereby bringing the spline portion 13 of the smaller-diameter portion 12 into spline engagement with the spline portion 25 of the center hole 24, so that the drive shaft 10 and the inner shaft 20 are connected together in a rotating direction. Also, an inner side surface 39 of the inner ring 31 is caused to abut against an outer side surface 16 of the larger-diameter portion 11 of the drive shaft 10, and a nut 15 is threaded on the screw portion 14 of the drive shaft 10, thereby pressing the drive shaft 10 toward the outer side relative to the inner shaft 20, so that the drive shaft 10 and the inner shaft 20 are connected together in the axial direction. By thus connecting the drive shaft 10 to the inner shaft 20, etc., a suitable preload is applied to the inner ring 31 of the rolling bearing 30, and also the drive shaft 10, the inner shaft 20 and the inner ring 31 can rotate in unison.

Here, abutting surfaces of the side surface 16 (of the larger-diameter portion 11 of the drive shaft 10) and the side surface 39 (of the inner ring 31) abutting against each other will be described. The side surface 16 and the side surface 39 are disposed perpendicular to the axis O of the rolling bearing apparatus 1. When the side surface 16 and the side surface 39 abut against each other, a contact pressure at the abutting surface of each of the side surfaces 16 and 39 is not uniform, and a contact pressure distribution is such that a maximum value is given at an end of the abutting surface, that is to say, a so-called edge load is liable to occur. A tensile force directed toward the outer side is applied to the smaller-diameter portion 12 of the drive shaft 10 by the nut 15 threaded thereon as described above, and therefore a contact pressure at an inner periphery-side of the abutting surface relatively increases, so that an edge load is liable to occur as indicated in a contact pressure distribution of FIG. 2. When the edge load occurs, there exists a region where the contact pressure is large, and a frictional resistance at this region increases, so that the frictional resistance of the abutting surfaces increases as a whole. Therefore, when a large torsional torque is applied to the abutting surfaces in a situation in which the vehicle is quickly started or is quickly turned, energy stored at the abutting surfaces increases, and an abnormal sound generated upon release of this energy becomes large.

Therefore, in this embodiment, crowning is applied to the side surface 39 of the inner ring 31 in the radial direction so as to suppress the occurrence of such an edge load described above. FIG. 3A is a perspective view of a portion of the inner ring 31, showing the shape of the side surface 39, and FIG. 3B is a fragmentary cross-sectional view showing the side surface 39 of the inner ring 31. Shapes formed by crowning, etc., described hereafter are shown in an exaggerated manner for better understanding. As shown in FIGS. 3A and 3B, the side surface 39 of the inner ring 31 is finished by crowning into such a shape that a radially-central portion 39a of the side surface 39 is higher than an inner periphery-side end portion 39b and an outer periphery-side end portion 39c of the side surface 39 which are spaced from each other in the radial direction. Such a crowning shape is formed by polishing or the like of the side surface 39.

An action, obtained when the pressing force is applied to the abutting surface of the side surface 16 (defined by a flat surface) of the drive shaft 10 and the abutting surface of the crowned side surface 39 of the inner ring 31 which abut against each other, will be described with reference to FIG. 4. As the nut 15 is threaded onto the screw portion 14 when connecting the drive shaft 10 and the inner shaft 20 together, the side surface 16 of the drive shaft 10 and the central portion 39a of the side surface 39 of the inner ring 31 are brought into contact with each other as shown in FIG. 4A. When the nut 15 is further threaded on the screw portion 14, the side surface 16 and the side surface 39 are slightly elastically deformed, so that an area A of contact therebetween is increasing as shown in FIG. 4B. Then, when the predetermined pressing force is applied between the side surface 16 and the side surface 39, the threading operation of the nut 15 is finished. At this time, the side surface 39 of the inner ring 31 abuts against the side surface 16 of the drive shaft 10 over the substantially entire area thereof from the inner periphery-side end portion 39b to the outer periphery-side end portion 39c as shown in FIG. 4C.

Figure 5:
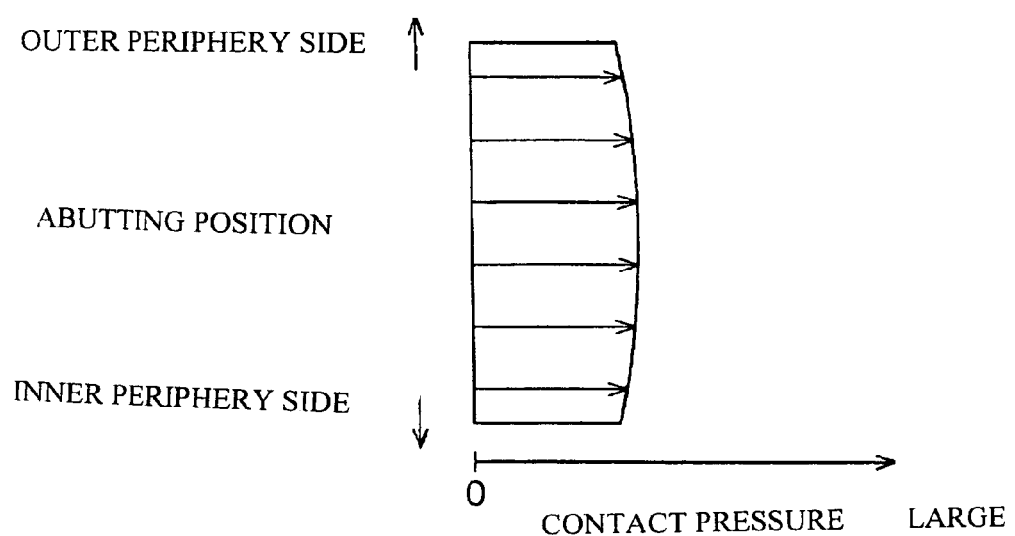
FIG. 5 is a graph showing a contact pressure distribution obtained at the abutting surfaces when the connection between the drive shaft and the inner shaft is completed.

FIG. 5 shows a contact pressure distribution obtained at the abutting surfaces in the radial direction when the threading operation of the nut 15 is finished, that is, the connection of the drive shaft 10 and the inner shaft 20 is finished. As shown in FIG. 5, by applying the crowning to the side surface 39 of the inner ring 31, the contact pressure distribution of the abutting surfaces in the radial direction can be made generally uniform.

Although the crowning shape varies depending on the rigidity of the drive shaft 10, the rigidity of the inner ring 31 and the pressing force applied by the nut 15, the crowning is set to such a shape that the contact pressure distribution of the abutting surfaces in the radial direction is made generally uniform. Generally, the drive shaft 10 is made of carbon steel such as S55C, and the inner ring 31 is made of bearing steel such as SUJ2 having surface hardness of 58 to 62 HRC. Therefore, the crowning shape of the side surface 39 can be found from a set value (for example, 2 to 10 tons) of the axial pressing force and Young's moduli of the drive shaft 10, the inner ring 31, etc. In this case, preferably, the side surface 39 in a longitudinal cross-section has a curvature, for example, of R 1,000 mm to R several tens of thousands mm, and preferably the side surface 39 is formed such that the axial distance D between the side surface 39 and the side surface 16 at the radial end portions is 10 to 500 μm in a condition in which the abutting surfaces are disposed in contact with each other without effecting the pressing by the nut 15 as shown in FIG. 4A.

In this manner, the occurrence of an edge load at the abutting surfaces can be suppressed when the drive shaft 10 and the inner shaft 20 are connected together, and an abnormal sound generated by a stick-slip phenomenon at the abutting surfaces can be reduced.

In the wheel rolling bearing apparatus 1 according to the above first embodiment, the following advantages can be obtained.

(1) In the first embodiment, the crowning is applied to the side surface 39 of the inner ring 31 in the radial direction, and therefore when the drive shaft 10 is connected to the inner shaft 20, etc., by threading the nut 15 on the screw portion 14, the contact pressure distribution of the abutting surfaces of the side surface 16 and the side surface 39 abutting against each other is made generally uniform, thereby suppressing the occurrence of an edge load. Therefore, the contact pressure is prevented from increasing at part of the abutting surfaces, and by doing so, energy released by the stick-slip phenomenon can be reduced, and a sound pressure level of an abnormal sound generated at this time can be reduced. Therefore, the sound pressure level of an abnormal sound, generated in a situation in which the vehicle is suddenly started or is suddenly turned, can be reduced.

(2) In the first embodiment, the crowning is applied to the side surface 39 of the inner ring 31 in the radial direction, and therefore even when the side surface 16 of the drive shaft 10 is very slightly inclined, for example, as indicated in a broken line X in FIG. 4A, the occurrence of an edge load can be suppressed, and the contact pressure can be prevented from increasing at part of the abutting surfaces.

(3) In the first embodiment, the contact pressure of the abutting surfaces is made generally uniform by applying the crowning to the side surface 39 of the inner ring 31 in the radial direction, and therefore the pressing force applied from the nut 15 can be increased while reducing the sound pressure level of the abnormal sound. Therefore, the strength of connection between the drive shaft 10 and the inner shaft 20, as well as the preload applied to the inner ring 31, can be sufficiently secured.

(4) In the first embodiment, the side surface 39 of the inner ring 31 is formed such that in the condition in which the abutting surfaces are disposed in contact with each other without effecting the pressing by the nut 15, the axial distance D from the side surface 39 to the side surface 16 at the radial end portions is 10 to 500 µm. Therefore, when the drive shaft 10 and the inner shaft 20 are connected together, the contact pressure distribution of the abutting surfaces can be made generally uniform while suppressing the occurrence of an edge load at the radial end portions.

(5) In the first embodiment, merely by processing the inner ring 31, that is, by applying the crowning to the side surface 39 of the inner ring 31, the occurrence of an edge load is suppressed, thereby reducing a sound pressure level of an abnormal sound generated by a stick-slip phenomenon. Therefore, in the case where the inner shaft 20 and the rolling bearing unit 30 are assembled together as a unit, and are delivered to a client's factory or the like where this unit is mounted on the drive shaft 10, the sound pressure level can be reduced merely by taking the necessary measures when delivering the unit. Therefore, it is not necessary to take any measures at the client's factory, and the burden on the client can be reduced.

Second Embodiment

Next, a wheel rolling bearing apparatus according to a second embodiment of the invention will be described with reference to FIG. 6. The wheel rolling bearing apparatus 2 according to the second embodiment differs from the wheel rolling bearing apparatus 1 according to the first embodiment in that an inner ring 31 is fixed to an inner shaft 20 by caulking a shaft end of the inner shaft 20. In those embodiments which will be described hereafter, those portions identical to those of the first embodiment will be designated by identical reference numerals, respectively, and description thereof will be omitted or briefly made.

Figure 6:
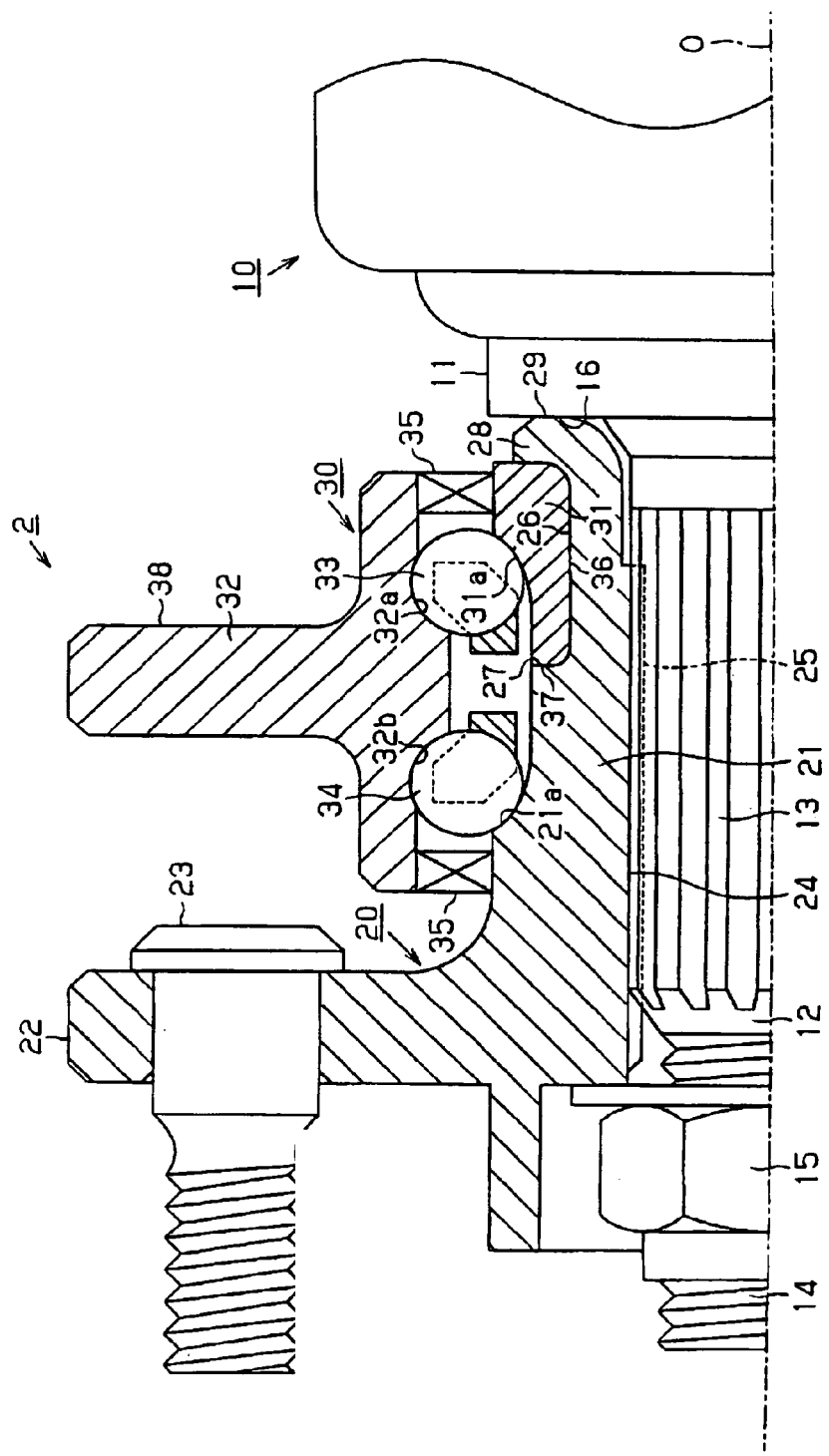
FIG. 6 is a longitudinal cross-sectional view of a wheel rolling bearing apparatus according to a second embodiment of the invention.

FIG. 6 is a longitudinal cross-sectional view of the wheel rolling bearing apparatus 2. As shown in FIG. 6, the inner ring 31 of a rolling bearing 30 is fixed by a caulking portion 28 formed by shaft end caulking. For effecting the shaft end caulking, first, an inner peripheral surface 36 of the inner ring 31 is fitted on an outer peripheral surface 26 of a shaft portion 21, and then an outer side surface 37 of the inner ring 31 is caused to abut against a step portion side surface 27 of the shaft portion 21, and in this condition a caulking jig is pressed against the shaft end of the shaft portion 21 from the inner side so as to effect the shaft end caulking. The shaft end is plastically deformed radially outwardly to form the caulking portion 28, thereby fixing the inner ring 31 in a manner to press the inner ring 31 toward the outer side. By doing so, the inner ring 31 is positively fixed to the inner shaft 20, and also a suitable preload is applied to the inner ring 31.

A drive shaft 10 and the inner shaft 20 are connected together in the following manner. A smaller-diameter portion 12 of the drive shaft 10 is inserted into a center hole 24 of the inner shaft 20, thereby bringing a spline portion 13 of the smaller-diameter portion 12 into spline engagement with a spline portion 25 of the center hole 24, so that the drive shaft 10 and the inner shaft 20 are connected together in a rotating direction. Also, an inner side surface 29 of the caulking portion 28 is caused to abut against an outer side surface 16 of a larger-diameter portion 11 of the drive shaft 10, and a nut 15 is threaded on a screw portion 14 of the drive shaft 10, thereby pressing the drive shaft 10 toward the outer side relative to the inner shaft 20, so that the drive shaft 10 and the inner shaft 20 are connected together in the axial direction. By thus connecting the drive shaft 10 and the inner shaft 20 together, the drive shaft 10, the inner shaft 20 and the inner ring 31 can rotate in unison.

Crowning is applied to the side surface 29 of the caulking portion 28 of the inner ring 31 in the radial direction as described above for the side surface 39 of the inner ring 31 according to the first embodiment. The side surface 29 is crowned into a shape similar to the shape of FIG. 3 by polishing or the like. A contact pressure distribution, obtained at abutting surfaces of the side surface 16 (defined by a flat surface) (of the drive shaft 10) and the crowned side surface 29 (of the caulking portion 28) when a pressing force is applied to these abutting surfaces, can be made generally uniform as shown in FIG. 5. Incidentally, the caulking portion 28 is formed by the shaft end caulking, and therefore generally the shaft end portion for forming this caulking portion 28 is not subjected to a hardening treatment. Therefore, the shape formed by the crowning is determined taking the material of the shaft portion 21 into consideration.

In the wheel rolling bearing apparatus 2 according to the second embodiment, the occurrence of an edge load at the abutting surfaces can be suppressed when the drive shaft 10 and the inner shaft 20 are connected together, and an abnormal sound generated by a stick-slip phenomenon of the abutting surfaces can be reduced. Therefore, advantages similar to the advantages (1) to (5) according to the first embodiment can be obtained.

The above embodiments can be modified as follows.

In the above embodiments, although the crowning is applied to the side surface 39 of the inner ring 31 or the side surface 29 of the caulking portion 28 in the radial direction, any suitable crowning such as arc-shaped crowning, oval crowning, trapezoidal crowning, etc., may be used in so far as the radially-central portion 39a is higher than the inner periphery-side end portion 39b and the outer periphery-side end portion 39c.

In the above embodiments, although the crowning is applied to the side surface 39 of the inner ring 31 or the side surface 29 of the caulking portion 28 in the radial direction, an end relief may be applied to the side surface 39 or 29 such that the height of the surface is gradually decreasing at predetermined areas (having a predetermined width) of the radially opposite end portions of the abutting surface. FIG. 7 shows the configuration obtained when such an end relief is applied to the side surface 39 of the inner ring 31. An area B of the central portion of the side surface 39 is formed into a flat surface perpendicular to the axis O of the bearing apparatus, and each of areas B of radially opposite end portions of the side surface 39 is formed into a surface whose height is gradually decreasing. Preferably, a length of the area B of the central portion of the side surface 39 is 60 to 80% of the entire length of the abutting surface in the radial direction. With this construction, also, the occurrence of an edge load at the abutting surfaces can be suppressed, and the contact pressure distribution can be made generally uniform, and an abnormal sound generated by a stick-slip phenomenon of the abutting surfaces can be reduced.

In the above embodiments, although the crowning is applied to the side surface 39 or the side surface 29 (opposed to the side surface 16 of the drive shaft 10) in the radial direction, crowning or an end relief may be applied to the side surface 16 of the drive shaft 10 in the radial direction.

Crowning or an end relief may be applied to both of the side surface 16 of the drive shaft 10 and the side surface 39 or 29. FIG. 8A shows a condition before the pressing is effected in the case where crowning is applied to both of the side surface 16 of the drive shaft 10 and the side surface 39 of the inner ring 31. FIG. 8B shows a condition before the pressing is effected in the case where an end relief is applied to both of the side surface 16 of the drive shaft 10 and the side surface 39 of the inner ring 31.

Crowning may be applied to one of the side surface 16 of the drive shaft 10 and the side surface 39 of the inner ring 31, and the other may be formed into a concave shape having a curvature smaller than a curvature of the crowned side surface. FIG. 8C shows a condition before the pressing is effected in the case where crowning is applied to the side surface 39 while the side surface 16 is formed into a concave shape. FIG. 8D shows a condition before the pressing effected in the case where crowning applied to the side surface 16 while the side surface 39 is formed into a concave surface. With any of the constructions of FIGS. 8A to 8B, the occurrence of an edge load can be suppressed, and a contact pressure distribution can be made generally uniform.

Third Embodiment

Figure 9:
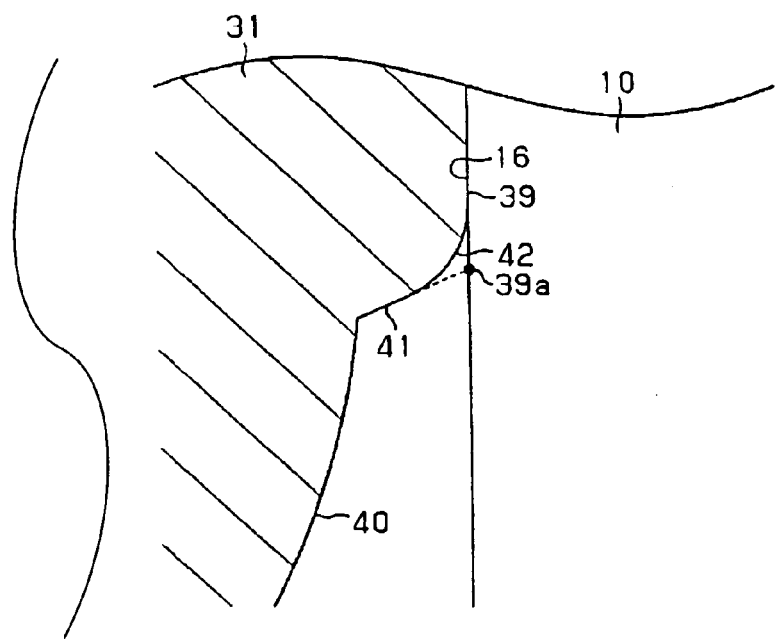
FIG. 9 is an enlarged cross-sectional view showing a wheel rolling bearing apparatus according to a third embodiment of the invention.

Next, a wheel rolling bearing apparatus according to a third embodiment of the invention will be described with reference to FIG. 9. In the third embodiment of the invention, those portions identical to those of the first embodiment will be designated by identical reference numerals, respectively, and description thereof will be omitted. In this embodiment, an inner ring 31 is constructed as follows in order to alleviate the occurrence of an edge load. FIG. 9 is an enlarged cross-sectional view of a portion A of FIG. 1. As shown in FIG. 9, a rounded surface 40 formed between an inner peripheral surface 36 and a side surface 39 of the inner ring 31 is not connected with the side surface 39 in tangential relation thereto, and an inner wall surface 41 of a conical or tapered shape is formed at an inner peripheral edge of the side surface 39.

The side surface 39 and inner peripheral surface 36 of the inner ring 31 are processed by polishing, and thereafter the rounded surface 40 is formed by turning. Thus, the inner ring 31 is processed according to this procedure, and therefore it is necessary to prevent the position of an inner peripheral end 39a of the side surface 39 from being varied by variations occurring when processing the rounded surface 40. The inner wall surface 41 is provided in order to prevent such position variation of the inner peripheral edge 39a. Namely, the position of the inner peripheral edge 39a is determined by the inner wall surface 41, and thereafter the rounded surface 40 is processed while leaving the inner wall surface 41.

Figure 10:
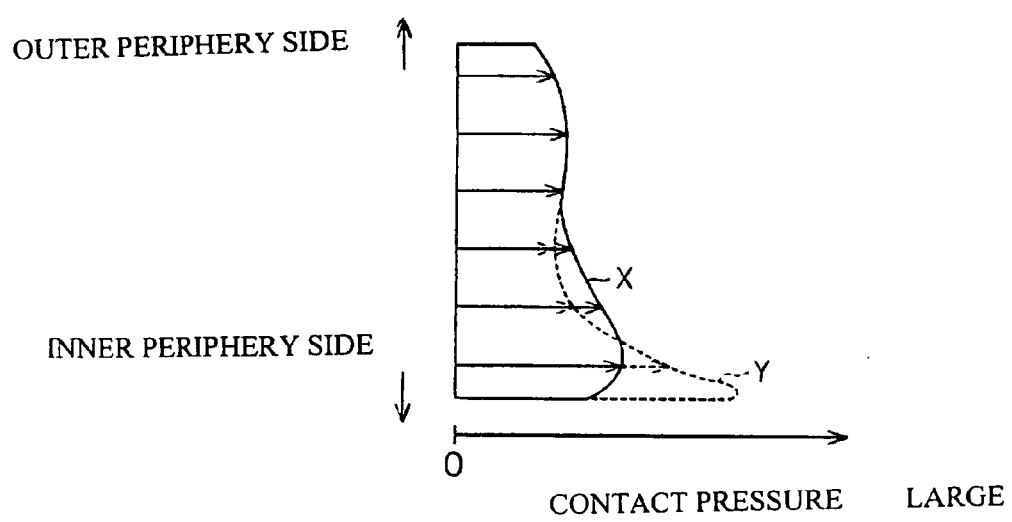
FIG. 10 is a graph showing pressure contact distributions of abutting surfaces.

Radius chamfering is applied to a corner portion defined by the side surface 39 and the inner wall surface 41. Thus, when a curved surface portion 42 is formed by the radius chamfering, the curved surface portion 42 is connected with the side surface 39 in tangential relation thereto, and therefore the inner peripheral end 39a of the side surface 39 is prevented from being formed into an edge shape. Therefore, the occurrence of an edge load can be alleviated as compared with the case where the radius chamfering is not applied to the corner portion defined by the side surface 39 and the inner wall surface 41. FIG. 10 shows a contact pressure distribution obtained at abutting surfaces when the radius chamfering is applied to the corner portion, and also shows a contact pressure distribution obtained when the radius chamfering is not applied to the corner portion. In FIG. 10, a solid line X indicates the contact pressure distribution obtained when the radius chamfering is applied, and a broken line Y indicates the contact pressure distribution obtained when the radius chamber is not applied. As shown in FIG. 10, the concentration of the contact pressure on the inner periphery-side portion is alleviated by the radius chamfering, and a peak value of the contact pressure occurring at the inner periphery-side portion is lowered.

Thus, the occurrence of an edge load at the abutting surfaces can be alleviated, and a frictional resistance of the abutting surfaces can be reduced, and therefore an abnormal sound generated by a stick-slip phenomenon can be reduced.

In the wheel rolling bearing apparatus 1 according to this embodiment, the following advantages can be obtained.

(1) In the above embodiment, the radius chamfering is applied to the corner portion defined by the side surface 39 and the inner wall surface 41 of the inner ring 31, and therefore the inner peripheral end 39a of the side surface 39 is prevented from being formed into an edge shape. Therefore, when the drive shaft 10 is connected to the inner shaft 20, etc., by threading a nut 15 on a screw portion 14, the occurrence of an edge load at the abutting surfaces can be alleviated. Therefore, the contact pressure is prevented from increasing at part of the abutting surfaces, and by doing so, energy released by a stick-slip phenomenon of the side surface 16 and the side surface 39 can be reduced, and a sound pressure level of an abnormal sound generated at this time can be reduced. Therefore, the sound pressure level of an abnormal sound, generated in a situation in which the vehicle is quickly started or is quickly turned, can be reduced.

(2) In the above embodiment, merely by processing the inner ring 31, that is, by applying the radius chamfering to the corner portion defined by the side surface 39 and the inner wall surface 41 of the inner ring 31, the occurrence of an edge load is alleviated, thereby reducing a sound pressure level of an abnormal sound generated by a stick-slip phenomenon. Therefore, in the case where an inner shaft 20 and a rolling bearing unit 30 are assembled together as a unit, and are delivered to a client's factory or the like where this unit is mounted on the drive shaft 10, the sound pressure level can be reduced merely by taking the necessary measures when delivering the unit. Therefore, it is not necessary to take any measures at the client's factory, and the burden on the client can be reduced.

The above embodiment may be modified as follows.

Figure 11:
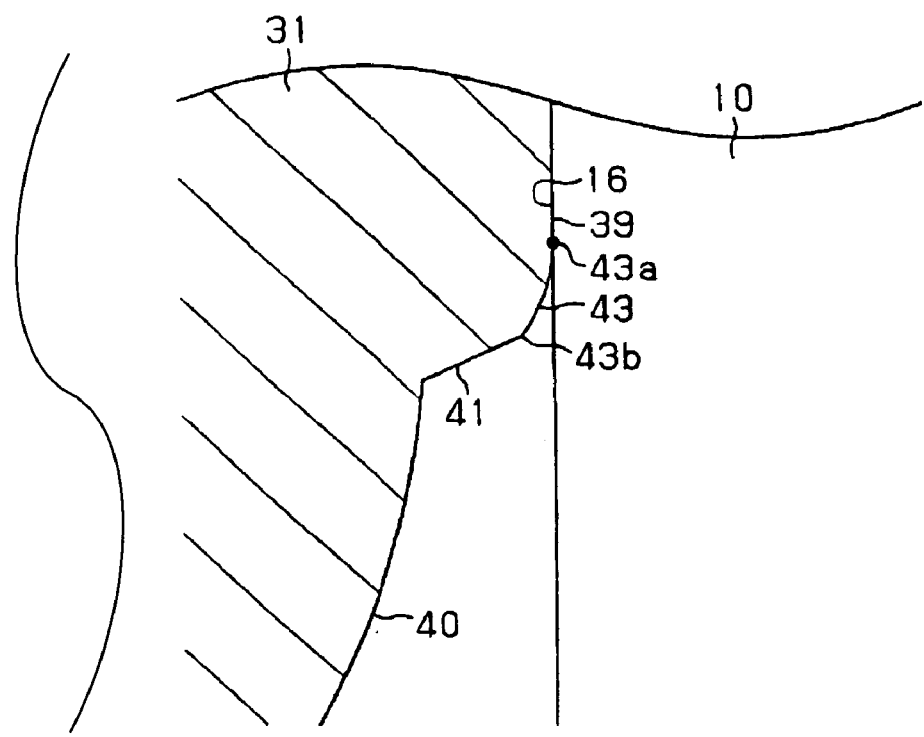
FIG. 11 is a cross-sectional view showing a modified curved surface portion of an inner ring of the invention.

In the above embodiment, although the radius chamfering is applied to the corner portion defined by the side surface 39 and the inner wall surface 41 of the inner ring 31 to form the curved surface portion 42, the curved surface portion 42 may take any other suitable form in so far as the curved surface portion 42 is connected with the side surface 39 in tangential relation thereto, and also the inner peripheral end 39*a* of the side surface 39 is not formed into an edge shape. FIG. 11 is a cross-sectional view of a modified curved surface portion 43. The curved surface portion 43 is defined by a rounded surface, and is connected at its one end 43*a* with the side surface 39 in tangential relation thereto, and is connected at the other end 43*b* with the inner wall surface 41 in non-tangential relation thereto. With this construction, also, the occurrence of an edge load at the abutting surfaces can be alleviated, and an abnormal sound generated by a stick-slip phenomenon can be reduced. Each of the curved surface portions 42 and 43 may be formed by a curved surface other than the rounded surface.

In the above embodiments, although the second raceway 21*a* (serving as the raceway surface for the outer balls 34) is formed on that portion of the outer periphery of the shaft portion 21 disposed close to the flange portion 22, a separate inner ring member may be provided on an outer side portion of the inner ring 31, in which case the second raceway 21*a* is formed on this inner ring member.

In the above embodiments, although the double row rolling bearing is used as the rolling bearing 30, a double row tapered roller bearing may be used.

What is claimed is:

1. A wheel rolling bearing apparatus comprising:
a drive shaft including a larger-diameter portion formed at an inner side portion thereof and a smaller-diameter portion formed at an outer side portion thereof;
an inner shaft mounted on an outer periphery of the smaller-diameter portion through a spline; and
an inner ring for a rolling bearing, mounted on an outer periphery of the inner shaft from an inner side,
wherein the drive shaft, the inner shaft and the inner ring are assembled together so that an inner side surface of the inner ring abuts against an outer side surface of the larger-diameter portion, and the drive shaft is pressed toward the outer side relative to the inner shaft, and wherein abutting portions of the side surfaces, abutting against each other, of the inner ring and the larger-diameter portion are formed respectively into such shapes that a pressure contact distribution obtained at the abutting surfaces by the pressing of the drive shaft is made generally uniform.

2. The wheel rolling bearing apparatus according to claim 1, wherein crowning is applied to at least one of the abutting surfaces in a radial direction.

3. The wheel rolling bearing apparatus according to claim 2, wherein the abutting surfaces are formed so that an axial distance between the abutting surfaces at radial end portions thereof is 10 to 500 μm in a condition in which the abutting surfaces are disposed in contact with each other without effecting the pressing.

4. The wheel rolling bearing apparatus according to claim 1, wherein an end relief is applied to at least one of the abutting surfaces in a radial direction.

5. The wheel rolling bearing apparatus according to claim 4, wherein the abutting surfaces are formed so that an axial distance between the abutting surfaces at radial end portions thereof is 10 to 500 μm in a condition in which the abutting surfaces are disposed in contact with each other without effecting the pressing.

6. A wheel rolling bearing apparatus comprising:
a drive shaft including a larger-diameter portion formed at an inner side portion thereof and a smaller-diameter portion formed at an outer side portion thereof;
an inner shaft mounted on an outer periphery of the smaller-diameter portion through a spline; and
an inner ring for a rolling bearing, fixed to the inner shaft by caulking an inner-side shaft end of the inner shaft;
wherein an inner side surface of a caulking portion formed by the caulked shaft end abuts against an outer side surface of the larger-diameter portion, and the drive shaft is pressed toward the outer side relative to the inner shaft, thereby connecting the drive shaft and the inner shaft together, and
abutting portions of the side surfaces, abutting against each other, of the caulking portion and the larger-diameter portion are formed respectively into such shapes that a pressure contact distribution obtained at the abutting surfaces by the pressing of the drive shaft is made generally uniform.

7. The wheel rolling bearing apparatus according to claim 6, wherein crowning is applied to at least one of the abutting surfaces in a radial direction.

8. The wheel rolling bearing apparatus according to claim 7, wherein the abutting surfaces are formed so that an axial distance between the abutting surfaces at radial end portions thereof is 10 to 500 μm in a condition in which the abutting surfaces are disposed in contact with each other without effecting the pressing.

9. The wheel rolling bearing apparatus according to claim 6, wherein an end relief is applied to at least one of the abutting surfaces in a radial direction.

10. The wheel rolling bearing apparatus according to claim 9, wherein the abutting surfaces are formed so that an axial distance between the abutting surfaces at radial end portions thereof is 10 to 500 μm in a condition in which the abutting surfaces are disposed in contact with each other without effecting the pressing.

11. A wheel rolling bearing apparatus comprising:
a drive shaft including a larger-diameter portion formed at an inner side portion thereof and a smaller-diameter portion formed at an outer side portion thereof;

an inner shaft mounted on an outer periphery of the smaller-diameter portion through a spline; and an inner ring for a rolling bearing, mounted on an outer periphery of the inner shaft from an inner side, wherein the drive shaft, the inner shaft and the inner ring are assembled together so that an inner side surface of the inner ring abuts against an outer side surface of the larger-diameter portion, and the drive shaft is pressed toward the outer side relative to the inner shaft, and wherein the inner ring has a curved surface portion formed at a corner portion defined by the inner side surface and an inner wall surface formed at an inner peripheral edge of the inner side surface, and the curved surface portion is connected with the inner side surface in tangential relation thereto.

12. The wheel rolling bearing apparatus according to claim 11, wherein the curved surface portion is formed by applying radius chamfering to a portion of the inner ring disposed between the inner side surface and the inner wall surface.

* * * * *